United States Patent
Wallén et al.

(10) Patent No.: US 11,101,966 B2
(45) Date of Patent: Aug. 24, 2021

(54) APPARATUSES AND COMPUTER PROGRAMS, AND METHODS FOR NETWORK NODE AND WIRELESS DEVICE FOR EFFICIENTLY PROVIDING INFORMATION

(71) Applicant: Telefonaktiebolaget LM Ericsson (publ), Stockholm (SE)

(72) Inventors: Anders Wallén, Ystad (SE); Yusheng Liu, Lund (SE); David Sugirtharaj, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 9 days.

(21) Appl. No.: 16/640,120

(22) PCT Filed: Aug. 16, 2018

(86) PCT No.: PCT/EP2018/072213
§ 371 (c)(1),
(2) Date: Feb. 19, 2020

(87) PCT Pub. No.: WO2019/042779
PCT Pub. Date: Mar. 7, 2019

(65) Prior Publication Data
US 2021/0194660 A1    Jun. 24, 2021

Related U.S. Application Data

(60) Provisional application No. 62/552,457, filed on Aug. 31, 2017.

(51) Int. Cl.
*H04L 5/00* (2006.01)
*H04L 1/00* (2006.01)

(52) U.S. Cl.
CPC .......... *H04L 5/0091* (2013.01); *H04L 1/0058* (2013.01); *H04L 5/0007* (2013.01); *H04L 5/0053* (2013.01); *H04L 5/0064* (2013.01)

(58) Field of Classification Search
CPC ... H04L 5/0091; H04L 5/0053; H04L 5/0007; H04L 5/0064; H04L 1/0058; H04W 48/12; H04W 72/0406; H04W 72/042
See application file for complete search history.

(56) References Cited

U.S. PATENT DOCUMENTS

2016/0198438 A1    7/2016 Wong et al.
2016/0302024 A1*  10/2016 Bennett .................... H04W 4/70
(Continued)

OTHER PUBLICATIONS

"List of WLAN channels"; Wikipedia, Sep. 22, 2007, consisting of 3-pages.
(Continued)

*Primary Examiner* — Kevin Kim
(74) *Attorney, Agent, or Firm* — Christopher & Weisberg, P.A.

(57) ABSTRACT

A method is arranged to be performed by a network node of a cellular communication system when operating according to a scheme where system information for enabling a wireless device to access a cell operated by the network node is broadcasted on an anchor channel. The method includes acquiring a first set of control information and a second set of control information to be provided to the wireless device, encoding the first set of control information to an information block, adapting the information block based on the second set of control information by selecting at least one of a plurality of partitions of the information block and broadcasting the adapted information block on the anchor channel. The selection provides information about the second set of control information. A method arranged to be performed (Continued)

by a wireless device of a cellular communication system is also provided.

20 Claims, 7 Drawing Sheets

(56) References Cited

U.S. PATENT DOCUMENTS

2016/0345118 A1    11/2016  Oh
2020/0037294 A1*   1/2020   Ma .................... H04W 72/1273

OTHER PUBLICATIONS

International Search Report and Written Opinion dated Dec. 20, 2018 for International Application No. PCT/EP2018/072213 filed on Aug. 16, 2018, consisting of 18-pages.
3GPP TR 36.888; Title: Study on provision of low-cost Machine-Type Communication (MTC) User Equipments (UEs) based on LTE; Agenda Item: V12.0.0 Source: Technical Specification Group Radio Access Network; Document for: Study; Location and Date: Valbonne, France Jun. 2013, consisting of 55 pages.
ETSI EN 300 328 V2.1.1; Wideband transmission systems; Data transmission equipment operating in the 2,4 GHz ISM band and using wide band modulation techniques; Harmonised Standard covering the essential requirements of article 3.2 of Directive 2014/53/EU; Nov. 2016, consisting of 101-pages.
IEEE Part 11: Wireless LAN MAC and PHY Specifications Std 802.11-2007; p. 673; 2007, consisting of 1-page.

* cited by examiner

APPARATUSES AND COMPUTER PROGRAMS, AND METHODS FOR NETWORK NODE AND WIRELESS DEVICE FOR EFFICIENTLY PROVIDING INFORMATION

CROSS-REFERENCE TO RELATED APPLICATIONS

This application is a Submission Under 35 U.S.C. § 371 for U.S. National Stage Patent Application of International Application No.: PCT/EP2018/072213, filed Aug. 16, 2018 entitled "APPARATUSES AND COMPUTER PROGRAMS, AND METHODS FOR NETWORK NODE AND WIRELESS DEVICE FOR EFFICIENTLY PROVIDING INFORMATION," which claims priority to U.S. Provisional Application No. 62/552,457, filed Aug. 31, 2017, entitled "APPARATUSES AND COMPUTER PROGRAMS, AND METHODS FOR NETWORK NODE AND WIRELESS DEVICE FOR EFFICIENTLY PROVIDING INFORMATION," the entireties of both of which are incorporated herein by reference.

TECHNICAL FIELD

The present disclosure generally relates to methods for network node and wireless device for efficiently providing system and/or control information from the network node and receiving it by the wireless device, and apparatuses and computer programs for implementing these. In particular, the disclosure relates to including information about one set of control information in the way another set of control information is provided.

Abbreviations

Abbreviation Explanation
DCI Downlink Control Information
DL Downlink
DMRS Demodulation Reference Signals
eNB evolved NodeB, base station
TTI Transmission-Time Interval
UE User Equipment
UL Uplink
LA Licensed Assisted
LAA Licensed Assisted Access
LTE-U LTE Unlicensed
SCell Secondary Cell
SRS Sounding Reference Signal
LBT Listen-before-talk
PDCCH Physical Downlink Control Channel
PUSCH Physical Uplink Shared Channel
PUCCH Physical Uplink Control Channel
QPSK Quadrature Phase Shift Keying
RRC Radio Resource Control
MFA MuLTEFire Alliance
MTC Machine-Type Communication
SC-FDMA Single-carrier Frequency Division Multiple Access

BACKGROUND

Cellular communication systems have traditionally used licensed frequency bands, and still use. The 3$^{rd}$ Generation Partnership Project (3GPP) initiative "License Assisted Access" (LAA) intends to allow Long Term Evolution (LTE) equipment to also operate in the unlicensed radio spectrum such as the 5 GHz band. The unlicensed spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

In addition to LAA operation, it should be possible to run LTE fully on the unlicensed band without the support from the licensed band. This is called LTE-U Stand Alone.

Regulatory requirements, however, may not permit transmissions in the unlicensed spectrum without prior channel sensing. Since the unlicensed spectrum must be shared with other radios of similar or dissimilar wireless technologies, a so-called listen-before-talk (LBT) method needs to be applied. LBT involves sensing the medium for a pre-defined minimum amount of time and backing off if the channel is busy. Due to the centralized coordination and dependency of terminal devices on the base-station (eNB) for channel access in LTE operation and imposed LBT regulations, LTE uplink (UL) performance is especially hampered. UL transmission is becoming more and more important with user-centric applications and the need for pushing data to cloud.

Today, the unlicensed 5 GHz spectrum is mainly used by equipment implementing the IEEE 802.11 Wireless Local Area Network (WLAN) standard. This standard is known under its marketing brand "Wi-Fi." Unlike the case in LTE, Wi-Fi terminals can asynchronously access the medium and thus show better UL performance characteristics especially in congested network conditions.

SUMMARY

The disclosure is based on the contribution that control information is provided both by transmitted information block and the way the information block is transmitted.

According to a first aspect, there is provided a method arranged to be performed by a network node of a cellular communication system when operating according to a scheme where system information for enabling a wireless device to access a cell operated by the network node is broadcasted on an anchor channel. The method comprises acquiring a first set of control information and a second set of control information to be provided to the wireless device, encoding the first set of control information to an information block, adapting the information block based on the second set of control information by selecting at least one of a plurality of partitions of the information block, wherein the selection provides information about the second set of control information, and broadcasting the adapted information block on the anchor channel.

The scheme may include a frequency hopping scheme where information enabling a wireless device to access a cell operated by the network node is periodically transmitted on the anchor channel on a dedicated frequency among the frequencies of the frequency hopping scheme.

The first set of control information may comprise at least one of: system bandwidth, information about control channels, and system frame number. The second set of control information may comprise at least one of: information about the frequency hopping scheme, periodicity of the periodically transmitted control information on the dedicated frequency, operating mode of the network node, applied channel access adaptivity, and system bandwidth.

The encoding of the first set of control information may comprise encoding the control information, repeating the encoded control information to form an encoded and rate matched sequence, and scrambling the encoded and rate matched sequence with a scrambling sequence, wherein the partitions of the information block may comprise parts of the information block corresponding to different phases of the scrambling sequence. Each partition of the information block may form a redundancy version of the information block, wherein the redundancy version provides the information about the second set of control information. The encoding of the first set of information and adapting the information block may include scrambling with a set of a plurality of scrambling phases to form a set of redundancy version of the information block, respectively, wherein the set of redundancy versions provides information about the second set of control information.

The first set of control information may correspond to at least a subset of information of a master information block as of a legacy LTE system, and the second set of control information may correspond to at least a subset of information enabling the wireless device to receive a physical downlink shared channel or a physical downlink control channel.

According to a second aspect, there is provided a method arranged to be performed by a wireless device of a cellular communication system when operating according to a scheme where system information enabling wireless devices to access a cell operated by the network node is broadcasted on an anchor channel. The method comprises receiving a transmission on the anchor channel, decoding the transmission to derive an information block comprising a first set of control information, and to derive a version of the information block among a plurality of versions of the information block indicating a second set of control information by which of the versions that is received.

The scheme may include a frequency hopping scheme where information, enabling the wireless device to access the cell operated by the network node of the cellular communication system, is periodically transmitted on the anchor channel on a dedicated frequency among the frequencies of the frequency hopping scheme.

The first set of control information may comprise at least one of: system bandwidth, information about control channels, and system frame number. The second set of control information may comprise at least one of: information about the frequency hopping scheme, periodicity of the periodically transmitted control information on the dedicated frequency, operating mode of the network node, applied channel access adaptivity, and system bandwidth.

The decoding of the transmission may comprise deriving the version of the information block by hypothesizing and evaluating hypotheses, wherein information associated with second set of control information is acquired, and decoding the information block to acquire the information associated with the first set of control information.

The deriving of the version of the information block may comprise deriving a scrambling phase among a plurality of scrambling phases on which the version of the information block was formed.

The deriving of the version of a set of information blocks may comprise deriving a set of scrambling phases, respectively, among a set of a plurality of scrambling phases on which the versions were formed.

The first set of control information may correspond to at least a subset of information of a master information block as of a legacy LTE system, and the second set of control information may correspond to at least a subset of information enabling the wireless device to receive a physical downlink shared channel.

According to a third aspect, there is provided a network node of a cellular communication system arranged to operate according to a scheme where information enabling a wireless device to access a cell operated by the network node is broadcasted on an anchor channel, wherein the network node is arranged to broadcast information on the dedicated frequency according to the method of the first aspect.

According to a fourth aspect, there is provided a wireless device of a cellular communication system arranged to operate according to a scheme where system information, enabling the wireless device to access a cell operated by a network node of the cellular communication system, is periodically broadcasted on an anchor channel, wherein the wireless device is arranged to receive and decode control information according to the method of the second aspect.

According to a fifth aspect, there is provided a computer program comprising instructions which, when executed on a processor of a network node, causes the network node to perform the method according to the first aspect.

According to a sixth aspect, there is provided a computer program comprising instructions which, when executed on a processor of a wireless device, causes the wireless device to perform the method according to the second aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

In the following disclosure, LTE will be used as a tangible example. However, the principles of inventive contributions herein may also be applicable to other systems, as will be readily understood from the disclosure below. Herein, the terms "wireless device" and "UE" are used interchangeably. Furthermore, the terms "base station", "network node", "eNodeB" and "eNB" are also used interchangeably.

Figure 1:
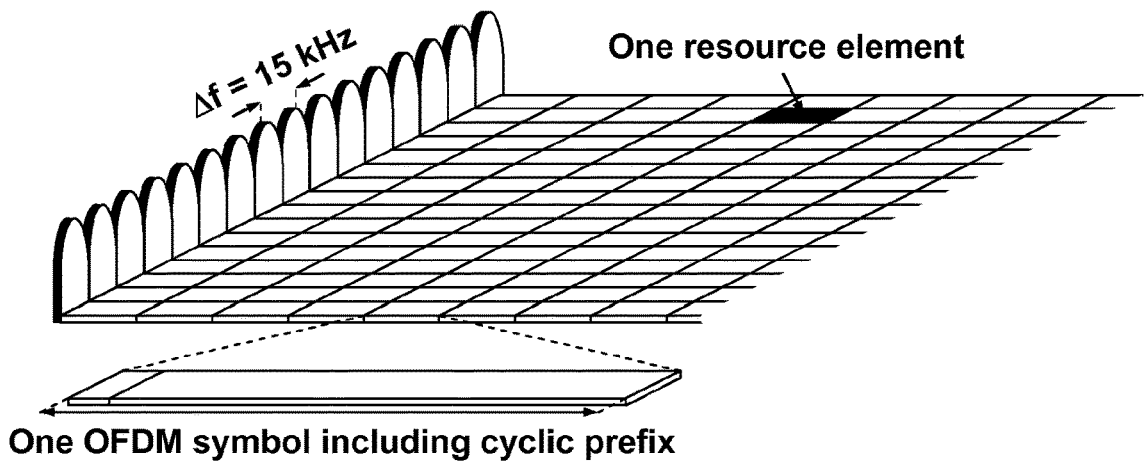
FIG. 1 schematically illustrates basic LTE downlink physical resources in a time-frequency grid.

LTE uses orthogonal frequency division multiplexing (OFDM) in the downlink and discrete Fourier transform (DFT) spread OFDM, also referred to as single-carrier frequency division multiple access (SC-FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

Figure 2:
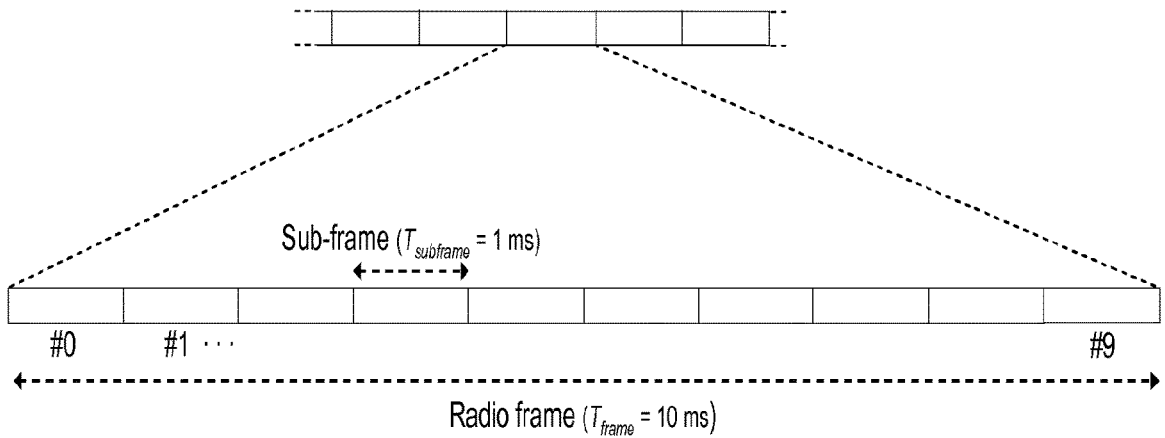
FIG. 2 illustrates a radio frame.

In the time domain, LTE downlink transmissions are organized into radio frames of 10 ms, each radio frame consisting of ten equally-sized subframes of length $T_{subframe}=1$ ms as shown in FIG. 2. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Figure 3:
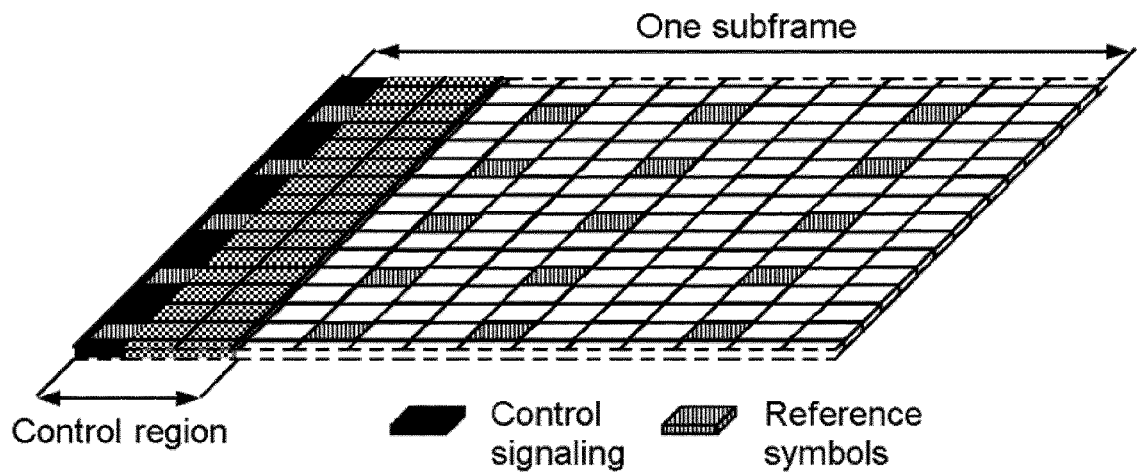
FIG. 3 illustrates OFDM symbols for downlink according to an example.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in F. The reference symbols shown in FIG. 3 are the cell specific reference symbols (CRS) and are used to support multiple functions including fine time and frequency synchronization and channel estimation for certain transmission modes.

Figure 4:
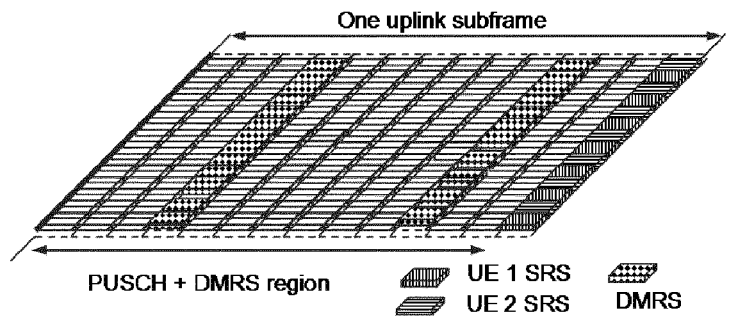
FIG. 4 illustrates an uplink subframe according to an example.

Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in PUSCH, uplink control information in PUCCH, and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, above described resource assignments can also be scheduled on the enhanced Physical Downlink Control Channel (ePDCCH). For Rel-8 to Rel-10 only Physical Downlink Control Channel (PDCCH) is available. Resource grants are UE specific and are indicated by scrambling the DCI Cyclic Redundancy Check (CRC) with the UE-specific C-RNTI identifier. A unique C-RNTI is assigned by a cell to every UE associated with it, and can take values in the range 0001-FFF3 in hexadecimal format. A UE uses the same C-RNTI on all serving cells.

The PDCCH/ePDCCH is used to carry downlink control information (DCI) such as scheduling decisions and power-control commands. More specifically, the DCI includes:

Downlink scheduling assignments, including Physical Downlink Shared CHannel (PDSCH) resource indication, transport format, hybrid-automatic repeat request (ARQ) information, and control information related to spatial multiplexing (if applicable). A downlink scheduling assignment also includes a command for power control of the Physical Uplink Control CHannel (PUCCH) used for transmission of hybrid-ARQ acknowledgements in response to downlink scheduling assignments.

Uplink scheduling grants, including Physical Uplink Shared CHannel (PUSCH) resource indication, transport format, and hybrid-ARQ-related information. An uplink scheduling grant also includes a command for power control of the PUSCH.

Power-control commands for a set of terminals as a complement to the commands included in the scheduling assignments/grants.

One PDCCH/ePDCCH carries one DCI message containing one of the groups of information listed above. As multiple terminals can be scheduled simultaneously, and each terminal can be scheduled on both downlink and uplink simultaneously, a possibility to transmit multiple scheduling messages within each subframe is provided. Each scheduling message is transmitted on separate PDCCH/ePDCCH resources, and consequently there are typically multiple simultaneous PDCCH/ePDCCH transmissions within each subframe in each cell. Furthermore, to support different radio-channel conditions, link adaptation can be used, where the code rate of the PDCCH/ePDCCH is selected by adapting the resource usage for the PDCCH/ePDCCH, to match the radio-channel conditions.

Here follows a discussion on the start symbol for PDSCH and ePDCCH within the subframe. The OFDM symbols in the first slot are numbered from 0 to 6. For transmissions modes 1-9, the starting OFDM symbol in the first slot of the subframe for ePDCCH can be configured by higher layer signaling and the same is used for the corresponding scheduled PDSCH. Both sets have the same ePDCCH starting symbol for these transmission modes. If not configured by higher layers, the start symbol for both PDSCH and ePDCCH is given by the CFI value signaled in Physical Control Format Indicator CHannel (PCFICH).

Multiple OFDM starting symbol candidates can be achieved by configuring the UE in transmission mode 10, by having multiple ePDCCH Physical Resource Block (PRB) configuration sets where for each set the starting OFDM symbol in the first slot in a subframe for ePDCCH can be configured by higher layers to be a value from {1,2,3,4}, independently for each ePDCCH set. If a set is not higher layer configured to have a fixed start symbol, then the ePDCCH start symbol for this set follows the CFI value received in PCFICH.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is desired to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (e)PDCCH on one CC to schedule data transmissions on another CC by means of a 3-bit Carrier Indicator Field (CIF) inserted at the beginning of the (e)PDCCH messages. For data transmissions on a given CC, a UE expects to receive scheduling messages on the (e)PDCCH on just one CC—either the same CC, or a different CC via cross-carrier scheduling; this mapping from (e)PDCCH to PDSCH is also configured semi-statically.

Simultaneously with the evolution of very wide-band solutions, there is an evolution of narrow-band solutions. These solutions are often driven by the group of services often referred to as the Internet of Things, IoT. Internet of Things can be considered a fast evolving market within the telecommunications realm. Current 3GPP based standards offer three different variants supporting IoT services, eMTC, NB-IoT and EC-GSM. eMTC and NB-IoT have been designed using LTE as a baseline, with the main difference between the two being the minimum occupied bandwidth. eMTC and NB-IoT use 1.4 MHz and 180 kHz minimum bandwidth respectively.

Both NB-IoT as well as eMTC have been designed with an operator deployment of macro cells in mind. Certain use cases where outdoor macro eNodeBs would communicate with IoT devices deep inside buildings are targeted, which require standardized coverage enhancement mechanisms.

3GPP LTE Rel-12 defined a UE power saving mode allowing long battery lifetime and a new UE category allowing reduced modem complexity. 3GPP Rel-13, further introduced the eMTC feature, with a new category, Cat-M1 that further reduces UE cost while supporting coverage enhancement. The key element to enable cost reduction for Cat-M1 UE is to introduce a reduced UE bandwidth of 1.4 MHz in downlink and uplink within any system bandwidth, which is addressed in 3GPP TR 36.888, v12.0.0, published June 2013.

In LTE the system bandwidth can be up to 20 MHz and this total bandwidth is divided into physical resource blocks (PRBs) a 180 kHz. Cat-M1 UEs with reduced UE bandwidth of 1.4 MHz only receives a part of the total system bandwidth at a time—a part corresponding to up to 6 PRBs. Here we refer to a group of 6 PRBs as a 'PRB group'.

In order to achieve the coverage targeted in LTE Rel-13 for low-complexity UEs and other UEs operating delay tolerant MTC applications, as addressed in 3GPP TR 36.888 referred to above, time repetition techniques are used in order to allow energy accumulation of the received signals at the UE side. For physical data channels (PDSCH, PUSCH), subframe bundling (a.k.a. TTI bundling) can be used. When subframe bundling is applied, each HARQ (re)transmission consists of a bundle of multiple subframes instead of just a single subframe. Repetition over multiple subframes are also applied to physical control channels.

Energy accumulation of the received signals involves several aspects. One of the main aspects involves accumulating energy for reference signals, e.g. by applying time-filters, in order to increase the quality of channel estimates used in the demodulation process. A second main aspect involves accumulation of demodulated soft-bits across repeated transmissions.

The UE performs periodic cell search and RSRP and RSRQ measurements in RRC Connected mode. It is responsible for detecting new neighbor cells, and for tracking and monitoring already detected cells. The detected cells and the associated measurement values are reported to the network. Reports to the network can be configured to be periodic or aperiodic based a particular event.

Figure 5:
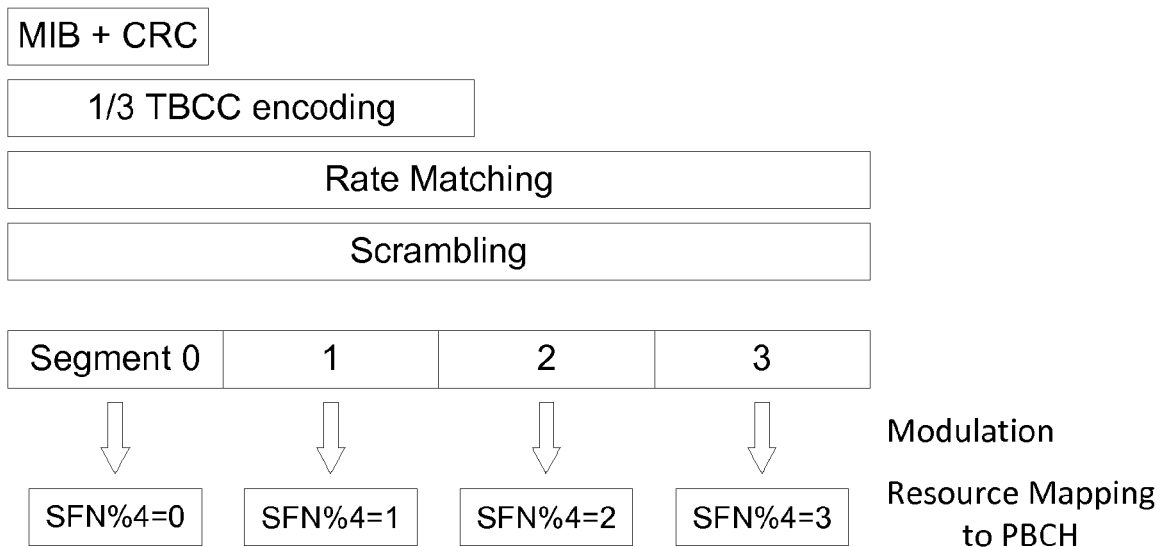
FIG. 5 schematically illustrates a legacy PBCH encoding process.

A Physical Broadcast Channel (PBCH) is used to transmit Master Information Block (MIB) using a broadcast transport channel (BCH), which contains essential information for UE to receive other system information blocks such as System Information Blocks (SIBs), in order to access the cell. These SIBs are transmitted on the PDSCH. PBCH occurs periodically every 4 radio frames (40 ms). It has robust channel coding using tail-biting convolutional coder (TBCC) of code rate 1/3, and then rate matched to 1920 bits resulting in a very low overall code rate of 1/48 for reliable reception by the cell-edge UEs. FIG. 5 schematically illustrates a legacy PBCH encoding process. Although considered well known in the field, a brief summary of the actions is presented here with an example assuming 24 bits of MIB payload. A 16-bit CRC is generated and scrambled with an antenna-specific mask. The generated CRC is attached to the payload bits, resulting in a 40-bit sequence. This sequence is channel coded by the TBCC, resulting in a channel coded 120-bit sequence. The channel coded sequence is rate matched to the 1920 bits by being repeated 16 times, and scrambled with a 1920-bit scrambling sequence. The scrambled sequence can then be modulated, e.g. with a QPSK modulation to 960 complex QPSK symbols. This is the basic operation for PBCH encoding. A PBCH modulation buffer may be divided into 4 sub-buffers each of 240 complex symbols.

The coded bits are segmented into 4 Redundancy Versions (RVs) and one RV is transmitted every 10 ms using 4 OFDM symbols. UE is able to soft-combine several RVs of the BCH transmissions, and determine the received PBCH RVs by hypothesizing and detecting all 4 possible phases of the scrambling sequence. UE further derives the SFN offset relative to the 40 ms PBCH transmission periodicity.

In 3GPP eMTC, each legacy PBCH segment can be transmitted utilizing a time repetition technique, wherein each of the 4 OFDM symbols of the core PBCH segment is repeated in 4 additional predetermined OFDM symbols. UE can accumulate the PBCH repetitions to improve decoding performance and meet the coverage enhancement target in Table 5.2.1.2-2 of 3GPP TR 36.888 referred to above.

For MulteFire PBCH (MF-PBCH), the encoded BCH bit sequence is rate matched to 2688 bits and each RV is transmitted using 6 OFDM symbols. The purpose is to improve the decoding reliability with a single instance of MF-PBCH transmission in unlicensed spectrum where transmission may be blocked due to listen-before-talk (LBT) failure.

To share the channel in the unlicensed spectrum, the LAA SCell cannot occupy the channel indefinitely. One of the mechanisms for interference avoidance and coordination among small cells is SCell ON/OFF feature. In Rel-12 LTE, discovery signals were introduced to provide enhanced support for SCell ON/OFF operations. Specifically, these signals are introduced to handle potentially severe interference situation (particularly on the synchronization signals) resulted from dense deployment as well as to reduce UE inter-frequency measurement complexity.

Unlicensed bands offer the possibility for deployment of radio networks by non-traditional operators that do not have access to licensed spectrum, such as e.g. building owners, industrial site and municipalities who want to offer a service within the operation they control. Recently, the LTE standard has been evolved to operate in unlicensed bands for the sake of providing mobile broadband using unlicensed spectrum. The 3GPP based feature of License Assisted Access (LAA) was introduced in Rel. 13, supporting carrier aggregation between a primary carrier in licensed bands, and one or several secondary carriers in unlicensed bands. Further evolution of the LAA feature, which only supports DL traffic, was specified within the Rel. 14 feature of enhanced License Assisted Access (eLAA), which added the possibility to also schedule uplink traffic on the secondary carriers. In parallel to the work within 3GPP Rel. 14, work within the MulteFire Alliance (MFA) aimed to standardize a system that would allow the use of standalone primary carriers within unlicensed spectrum. The resulting MulteFire 1.0 standard supports both UL and DL traffic.

There may be a potential to evolve existing unlicensed standards to also support IoT use-cases within unlicensed bands. For example, there may be an opportunity for developing new standards that would have either of NB-IoT or eMTC as baseline. A key issue to consider for such a design are the regulatory requirements, which differ depending on frequency band and region.

One specific frequency band that may be eligible for IoT operation would be the band in the vicinity of 2.4 GHz. Requirements for the European region are specified within the ETSI harmonized standard for equipment using wide band modulation, ETSI publication EN 300 328, v2.1.1, published November 2016. Some key requirements from ETSI EN 300 328 will be discussed herein.

ETSI EN 300 328 provisions several adaptivity requirements for different operation modes. From the top-level equipment can be classified either as frequency hopping or non-frequency hopping, as well as adaptive or non-adaptive. Adaptive equipment is mandated to sense whether the channel is occupied in order to better coexist with other users of the channel. The improved coexistence may come from e.g. LBT, or detect and avoid (DAA) mechanisms. Non-frequency hopping equipment are subject to requirements on maximum power spectral density (PSD) of 10 dBm/MHz, which limits the maximum output power for systems using narrower bandwidths.

ETSI EN 300 328 requirements for non-adaptive frequency hopping include the following key parts:
A maximum on-time of 5 ms, which is required to be followed by a transmission gap.
A minimum duration of the transmission gap of 5 ms.
A maximum accumulated transmit time of 15 ms, which is the maximum total transmission time a node may be allowed to use before moving to the next frequency hop.

ETSI EN 300 328 requirements for adaptive frequency hopping include the following key parts:
Each transmission is preceded by an LBT.
The maximum channel occupancy time is 60 ms, after which a new LBT needs to be performed in case the equipment prefers to continue dwelling on the same frequency.
The maximum dwell time is 400 ms.

ETSI EN 300 328 also states requirements for any type of frequency hopping equipment on Frequency occupation according to:
Option 1: Each hopping frequency of the hopping sequence shall be occupied at least once within a period not exceeding four times the product of the dwell time and the number of hopping frequencies in use.
Option 2: The occupation probability for each frequency shall be between ((1/U)·25%) and 77%, where U is the number of hopping frequencies in use.

It would for example be possible to, e.g. within the MulteFire Alliance Forum, create an IoT standard, aimed for the unlicensed 2.4 GHz band, which builds on the eMTC standard as defined for use in licensed spectrum.
An assumption is that about the following apply:
eNB equipment qualifies as using adaptive frequency hopping based on LBT according to ETSI regulations, baseline assumption for bandwidth is 1.4 MHz, although wider bandwidths may apply.
User equipment qualifies as using non-adaptive frequency hopping according to ETSI regulations, using a maximum bandwidth of 1.4 MHz
Support a "fixed dwell time" of 80 ms with flexible DL/UL switching point.

In a network as assumed, the eNB and UE typically use frequency hopping techniques to randomize interference by hopping through a set of frequency channels in the unlicensed band. To facilitate cell discovery and reduce delay, a pre-defined anchor channel is used to transmit synchronization signals, broadcast channels etc. so that UE only needs to search the anchor frequency to discover any such cell, find cell timing and receive essential system information to further access the cell.

The transmission burst on an anchor channel is typically in the order of milliseconds (e.g. 5 ms) to allow for enough repetitions of synchronization signals and broadcast messages and meet the coverage requirements. The eNB then hops to other frequencies to transmit and/or receive data bursts before revisiting the anchor channel.

LTE PBCH transmission time interval (TTI) is defined as 40 ms. However, the periodicity of the anchor channel is typically larger than the PBCH TTI in order to reduce the anchor channel transmission overhead and increase system capacity for data transmission. Consider a fixed dwell time of 80 ms for data hopping channels which sets the lower limit of anchor channel revisiting periodicity. The revisiting may also occur after dwelling on multiple data hopping channels, which means anchor channel revisit periodicity will be an integer multiple of PBCH TTI, and the consequence is that only 1 PBCH RV can be transmitted in anchor channel bursts. Due to the restriction above, the presence of the synchronization channel (SCH) determines the frame offset. In addition, PBCH transmission is repeated within the same anchor channel burst to ensure single shot decoding performance, thus soft combining of different PBCH segments across multiple anchor channel bursts is not likely to occur.

As demonstrated above, the PBCH RV in legacy LTE and MulteFire indicates the frame offset to SFN modulo 4, and it is of 2 bits information which can be blindly detected by UE via the phase of the scrambling sequence. In the above assumed network, for the reasons mentioned above, the PBCH transmissions in the anchor channel may only be of the same RV, leaving the other RVs never used. Considering the small PBCH payload (24 bits in legacy LTE and MulteFire), there is a potential improvement of spectrum efficiency of about 8% (26 bits vs. 24 bits), or potential strengthening of coding gain, which will be demonstrated herein.

In the assumed system, the anchor channel periodicity and thus the PBCH occurrences can be an integer multiple of the PBCH TTI. The usage of PBCH RV in legacy standards leads to poor spectrum efficiency. The improvement of spectrum efficiency by using the presence of PBCH to indicate a pre-defined frame offset, and the RV of PBCH segments can be used for indicating system information without explicit signalling in the MIB/PBCH payload.

Another aspect of the disclosure is to indicate existing PBCH payload information by the PBCH RV. This will reduce the size of MIB and yield higher PBCH coding gain.

The information carried by the RV of PBCH segments can for example be:
  a. frequency hop-set
  b. system bandwidth
  c. PBCH periodicity
  d. network operating mode (e.g. hopping or non-hopping)
  e. channel access adaptivity (e.g. LBT or non-LBT)

The examples above are non-limiting and other parameters could also be specified. In addition to using single RV in all PBCH repetitions, the eNB may also transmit different RVs for each PBCH repetition, and indicate system information by the combination of used RVs.

In addition to the benefits of improved spectrum efficiency and/or coding gain, the similarity in most parts with legacy systems provides the benefit of reuse of existing hardware with only slight modifications, possibly achieved through modified firmware or software.

Figure 6:
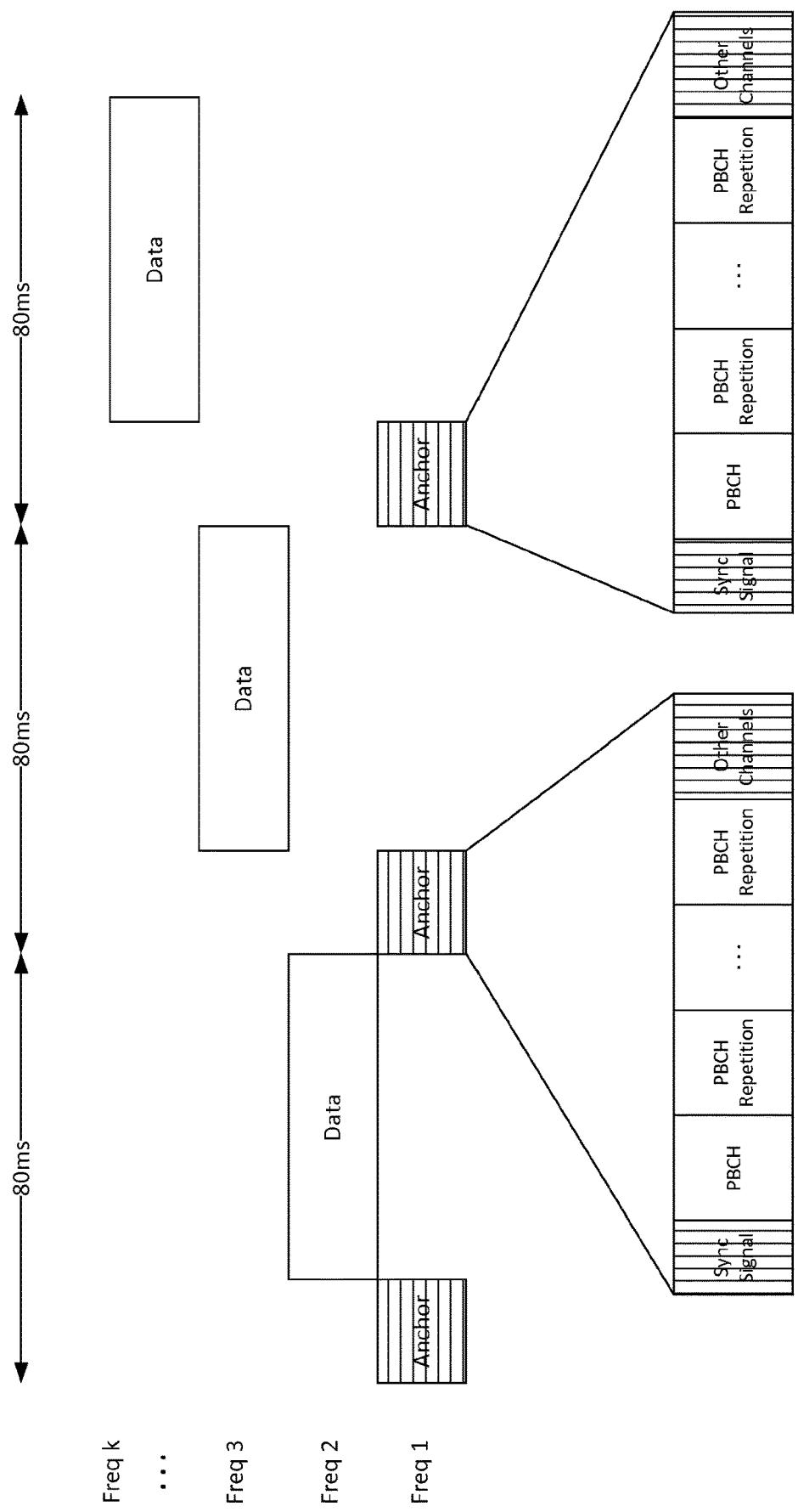
FIG. 6 illustrates an example of a transmission according to the context of this disclosure.

FIG. 6 illustrates an example of a transmission in the assumed network. The eNB performs frequency hopping over a set of frequency channels, Freq 2 to Freq k, for data transmission and reception, and periodically returns to an anchor channel on a dedicated frequency, denoted Freq 1 in FIG. 6, for this to transmit synchronization signal and broadcast channel etc. There are multiple repetitions of the PBCH segment in an anchor channel burst so that UEs in deep coverage can accumulate and decode from multiple instances of PBCH within the same anchor channel burst.

In some embodiments, each PBCH repetition has the same RV as the first PBCH transmission, i.e. the PBCH segments within an anchor channel burst are identical with the same phase of the scrambling sequence. Since the coded PBCH data is segmented into 4 segments, there are 4 different scrambling phases and in total 4 RVs. As described above for legacy LTE, the detected RVs are used to indicate frame offset, but since the anchor channel always occurs with offset 0 in the above example, the frame offset can be determined by the successful reception of PBCH. To improve spectrum efficiency, these 4 RVs can be used to indicate system information that is essential for UE to access the cell.

In one embodiment, the RV can be used to indicate a set of hopping frequencies that the eNB will transmit within the unlicensed band. For example, RV0 may indicate that the eNB hops through the whole 2.4 GHz band, and RV1~3 may indicate a sub-band hopping mode where each RV indicates one part of the 2.4 GHz band. The sub-band may be chosen such that it is within an 802.11 channel. This is useful when there's high interference in a certain 802.11 channel so that an eNB in the assumed network can choose a less interfered portion of the unlicensed band to operate on.

In another embodiment, the RV can be used to indicate the periodicity of anchor channel occurrence. One reason of having different anchor channel periodicity can be utilizing the hopping frequencies evenly, i.e. the accumulated transmission time on each hopping frequency is the same. For example, when there are in total 16 hopping frequencies and the eNB dwell 80 ms on each data channel then return to anchor channel, each anchor channel burst needs to be 80/16=5 ms to have equal utilization of each hopping frequency. For another example, when there are 32 hopping frequencies and the eNB dwell 80 ms on each data channel, in order to still transmit 5 ms anchor channel burst (to ensure enough repetitions PBCH etc.), the eNB needs to revisit the anchor channel every 32.5=160 ms, i.e. eNB hops on 2 data channels before returning to the anchor channel.

In another embodiment, the RV can be used to indicate in which mode the eNB fulfils regulatory requirements. Some examples of operating modes are whether the eNB is operating in the frequency hopping mode or not, or whether the eNB is operating in an adaptive mode (e.g. with listen before talk, LBT) or a non-adaptive mode (e.g. without LBT). The system bandwidth associated with a certain mode of operation may also be indicated by the RV.

Figure 7:
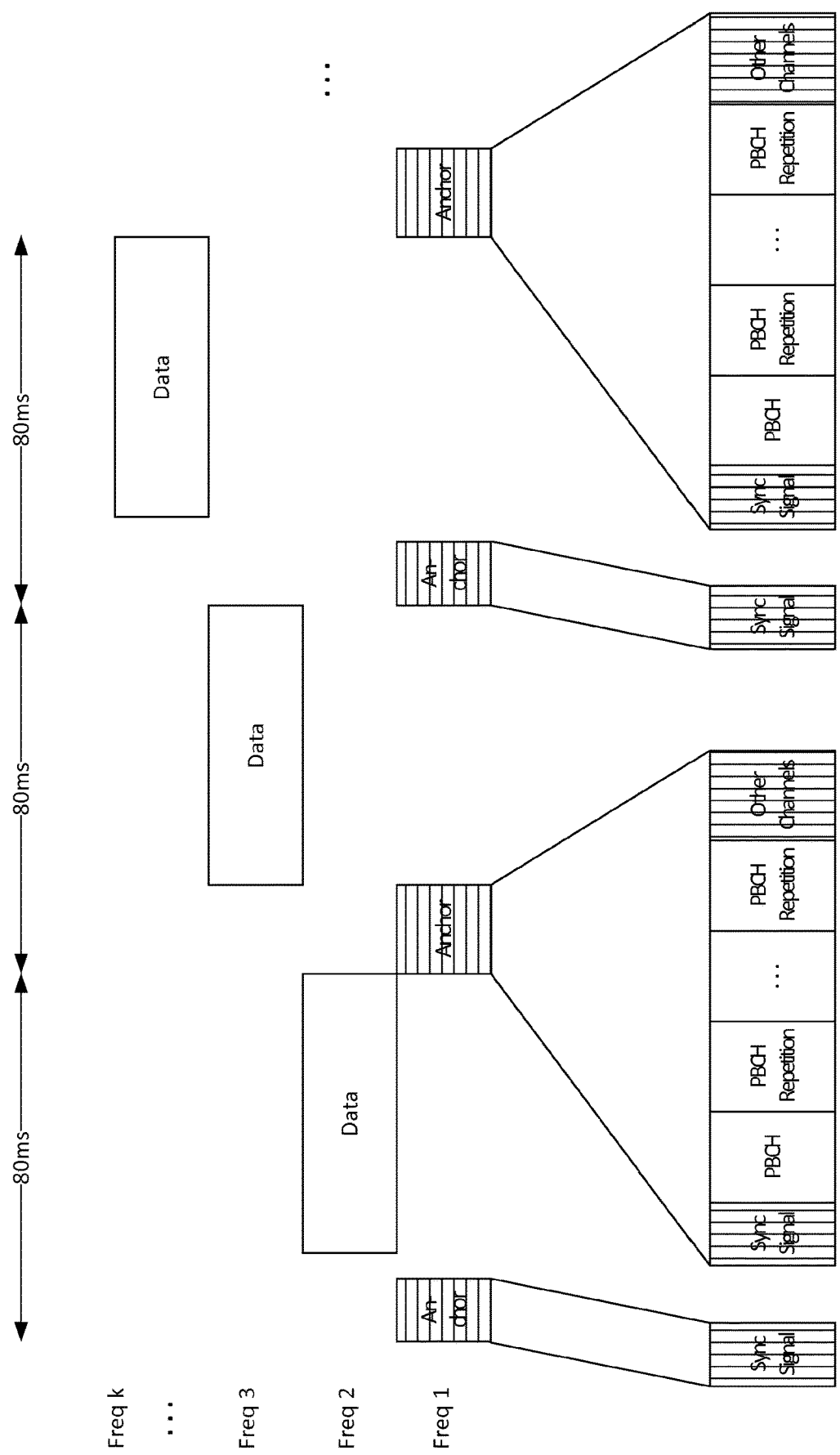
FIG. 7 illustrates an example of a transmission where PBCH periodicity is different from the synchronisation signal periodicity.

In some other embodiments, PBCH may not be present in some anchor channel bursts. One reason can be that synchronization signals need to be more frequent compared to MIB so that UE will have less delay in discovering and measuring the cell. FIG. 7 illustrates an example where PBCH periodicity is different from the synchronisation signal periodicity. eNB may utilize PBCH RV to indicate the relation between PBCH periodicity and Synchronisation Signal periodicity. For example, RV 0 may indicate that PBCH is present in every anchor channel burst; for another example, RV 1 may indicate that PBCH is present in every other anchor channel burst.

Figure 8:
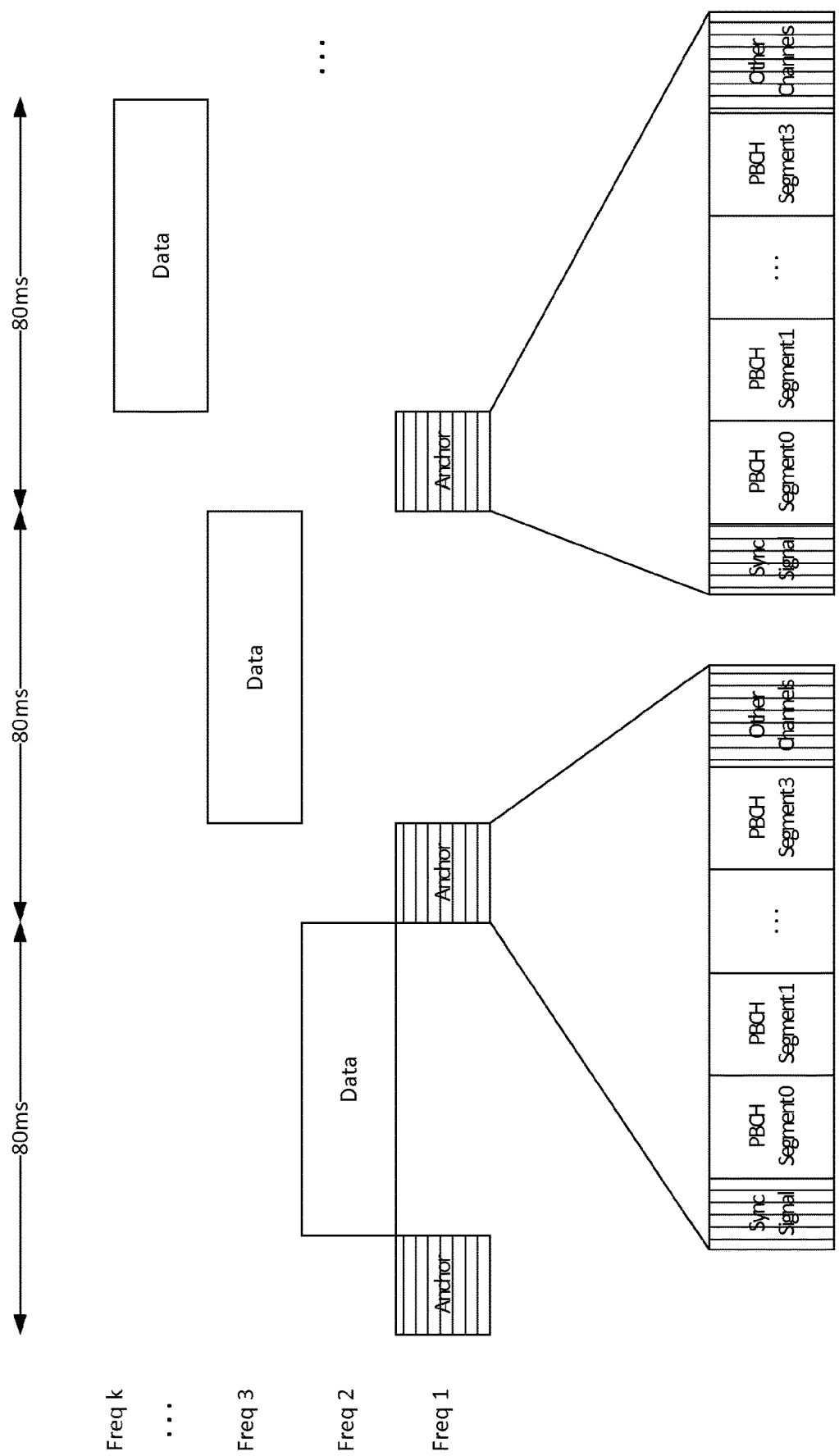
FIG. 8 illustrates an example of a transmission where repetitions may have different versions or partitions.

In some other embodiments, each PBCH repetition may have a different RV from the first PBCH in the anchor channel burst. FIG. 8 illustrates an example where repetitions may have different RV from the first PBCH segment. The RV combinations are pre-defined so that the UE receiver can hypothesize each combination and detect the matching one. The advantage is that more information can be indicated by RV combinations, for example if there are in total 5 PBCH segments transmitted in an anchor channel burst, there will be $2^5=32$ combinations that can be used for indicating configurations, such as combinations of system information parameters. The drawback is that it impacts power consumption since UE needs to receive all PBCH segments in the anchor channel burst to make such decision, even for UEs in good coverage that could decode PBCH using not all repetitions. Considering the anchor channel burst is relatively short, and UE does not read MIB frequently, the impact on power consumption should be very limited. Furthermore, if the number of configurations to be indicated is fewer than the number of possible combinations, only a subset of the combinations need to be used, or several combinations may indicate the same configuration. Both these may enable shorter decoding time.

In alternative embodiments, the PBCH repetitions are carried out on a OFDM symbol level, where the complete repeated PBCH transmission consists of OFDM symbols belonging to any of the PBCH segments in one or more predetermined pattern. The only requirement is that the OFDM symbols are selected such that the PBCH message can be successfully decoded. Each predetermined pattern of the transmission can be used to indicate a configuration, such as a combination of system information parameters. In these embodiments, the number of possible combinations of OFDM symbols becomes very large, and thus only a subset of the possible combinations may have to be used, or several combinations may indicate the same configuration. In some of these embodiments, the combination of OFDM symbols is selected such that a UE in good coverage may be able to decode PBCH, including determining which configuration is being indicated, using only a fraction of the complete PBCH burst.

Figure 9:
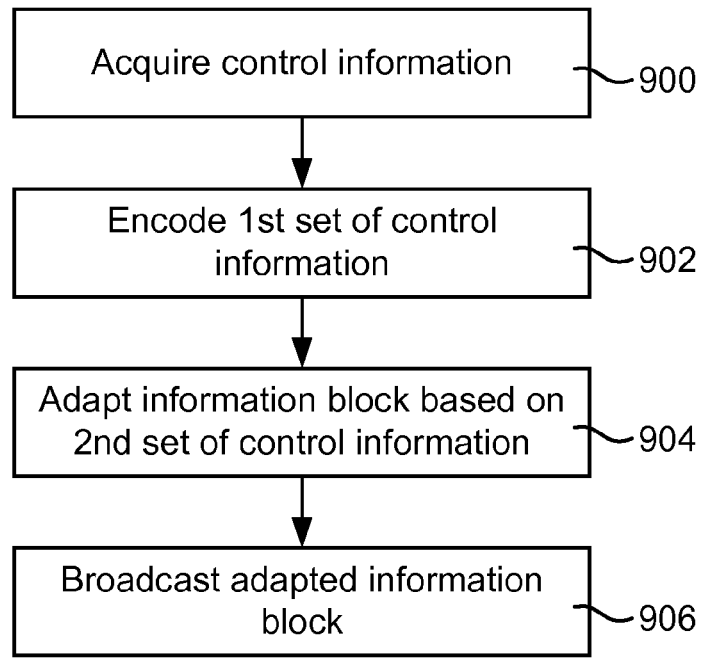
FIG. 9 is a flow chart schematically illustrating a method of a network node according to an embodiment.

FIG. 9 is a flow chart schematically illustrating a method of a network node according to an embodiment. The network node acquires 900 control information to be provided to one or more UEs. The control information may be generated by the network node and/or be received from one or more control nodes of the network, e.g. via one or more interfaces through a wired or wireless connection to such control node(s). The control information comprises a first set of control information and a second set of control information. For example, the first set of control information may comprise information about system bandwidth, control channels, system frame number, etc. The first set of control information may for example correspond to that provided in MIB of legacy LTE, or a derivate thereof. That is, the first set of control information preferably comprises very basic information which the wireless device needs to establish or maintain a connection with the network node. However, in addition to this very basic information, the wireless device needs further information to be able to properly interact with the network node. At least some of that information is comprised in a second set of information. The second set of control information may for example comprise information enabling the wireless device to receive a physical downlink control channel, PDCCH, or a physical downlink shared channel, PDSCH. Such PDSCH transmissions may for example contain SIBs as described above. The second set of control information may for example comprise information about a frequency hopping sequence, periodicity of periodically transmitted control information, operating mode of the network node, applied channel access adaptivity, etc. The assigning of what information that is provided in the first and the second sets of control information may be selected as considered appropriate, wherein for example system bandwidth may be provided in the second set of control information instead of in the first set of control information. Considering the example demonstrated above, where the first set of control information corresponds to about a little more than 20 bits, and the ability to indicate the second set of control information by selected versions or partitions of the information block with the first set of control information is limited to a few bits, the amount of information in the second set of control information is limited and what type of information that is comprised in this way of the second set of control information is preferably prioritized and selected to provide control information which helps the wireless device to commence connecting.

The network node encodes 902 the first set of control information and forms an information block. This may for example be performed in a similar way as forming a legacy LTE MIB information block. For example, the first set of control information is encoded, and the encoded control information is then repeated to form a longer sequence, i.e. an encoded and rate matched sequence, similar to what has been demonstrated for the legacy LTE with reference to FIG. 5. Other actions could be included, e.g. the rate matching may for example include some interleaving scheme. The encoded and rate matched sequence may then be scrambled with a scrambling sequence to form the information block.

The information block is then adapted 904 based on the information of the second set of control information by selecting at least one of a plurality of partitions or versions of the information block where the selection carries the information from the second set of control information. The amount of information of the second set of control information that is possible to convey this way depends on the number of partitions or versions available, and also whether the same partition or version is used for all transmissions or if a set of partitions or versions are used, as demonstrated above. The adapted information block(s) is(are) then broadcasted 906 on an anchor channel, as demonstrated above.

Figure 10:
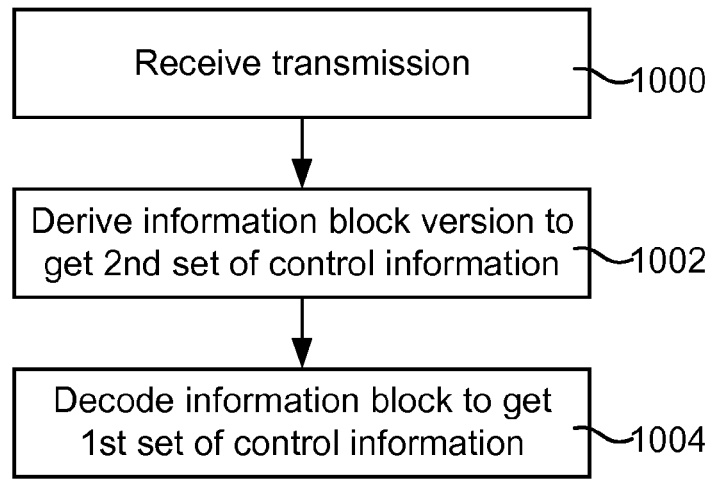
FIG. 10 is a flow chart schematically illustrating a method of a wireless device according to an embodiment.

FIG. 10 is a flow chart schematically illustrating a method of a wireless device according to an embodiment. The wireless device receives 1000 a transmission comprising adapted information block as demonstrated above. The wireless device derives 1002 information block partition or version, wherein the conveyed information about the second set of control information is gained. The derivation 1002 may comprise hypothesis testing of which partition or version that was used in the transmission. The derivation may be based on one adapted information block, e.g. when the same partition or version is used for all transmissions, or be based on a set of adapted information blocks, e.g. when a set of partitions or versions are used. Hence, the wireless device gets the second set of control information. The adapted information block is decoded 1004, wherein the first set of control information is gained. The order of actions illustrated in FIG. 10, e.g. actions 1002 and 1004 is an example which may be made in any order, simultaneously, or jointly in a single step. Considering for example the four PBCH partitions illustrated in FIG. 5, the wireless device may for example attempt to decode one PBCH based on scrambling phase of the different partitions. For one of the partitions, a cyclic redundancy check, CRC, will indicate a successful reception, which will give the wireless device information about both the content of the first set of control information, by the successful decoding of the received information, and the second set of control information, by the determination which version gave the successful CRC. That is, the wireless device is able to determine which partition or version that the network node selected when encoding the transmission and thereby determine the second set of information since that was used for the selection. Here, it is assumed that mapping between selected partitions or versions is commonly known by the network node and the wireless device.

Figure 11:
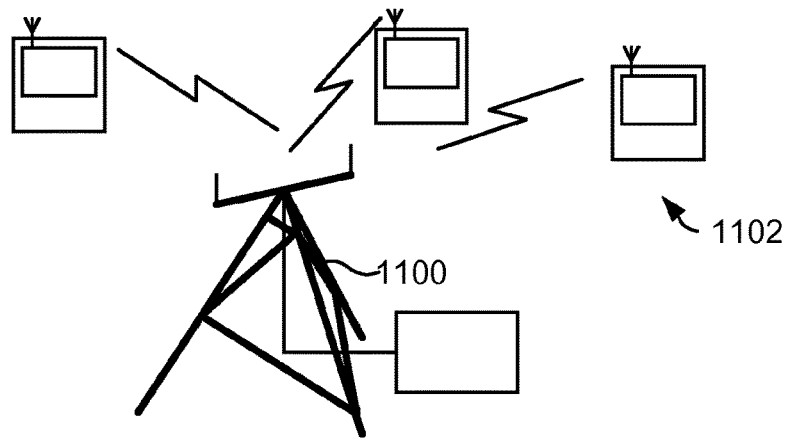
FIG. 11 illustrates a cellular network comprising a network node.

FIG. 11 illustrates a cellular network comprising a network node 1100, e.g. an eNodeB, for wireless access operating in the cellular network for a licensed or unlicensed frequency band and arranged for serving wireless devices 1102 in an unlicensed frequency band. The network node 1100 is arranged to operate according to any of the approaches or combination of approaches as demonstrated above.

Figure 12:
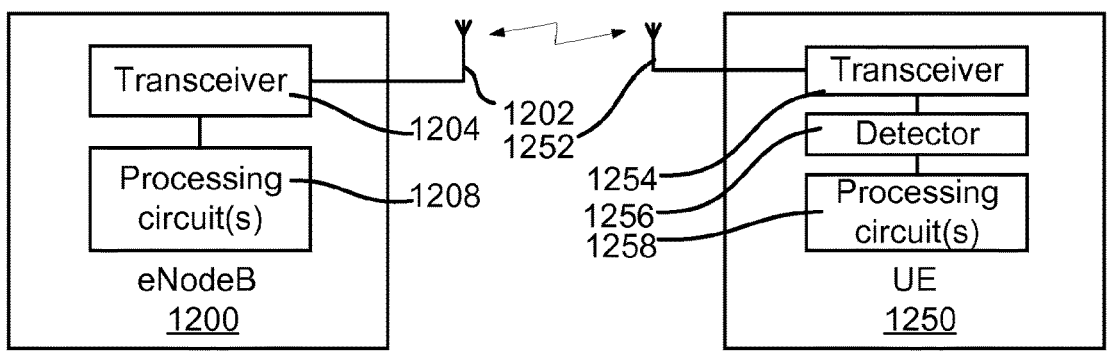
FIG. 12 shows a block diagram of one exemplary network node serving a cell in unlicensed band, and a wireless device in an exemplary wireless communication network.

FIG. 12 shows a block diagram of one exemplary network node 1200, e.g., eNodeB, serving a cell in unlicensed band and a wireless device 1250 in an exemplary wireless communication network. The eNodeB 1200 includes an antenna arrangement 1202, a transceiver 1204, and a processing circuit 1208. The transceiver 1204 and/or processing circuit 1208 may perform the steps detailed with reference to FIG. 9 and implement the approach demonstrated above. The wireless device 1250 includes an antenna arrangement 1252, a transceiver 1254, a detector circuit 1256, and processing circuit 1258. Transceiver 1254 receives signals, among them signals comprising adapted information blocks according to any of the examples given above. Depending on the capabilities of the detector circuit 1256 of the wireless device 1250 regarding handling multiple hypotheses, e.g. for scrambling codes, the wireless device 1250 is enabled by the eNodeB 1200 to obtain control information efficiently, which for example may provide the advantage of power saving, which may increase battery time of the wireless device 1250.

The solutions presented herein provide many advantages over existing solutions. For example, the solution presented herein enables a MuLTEFire network to improve performance, as well as to other LTE-like transmissions in unlicensed spectrum.

Figure 13:
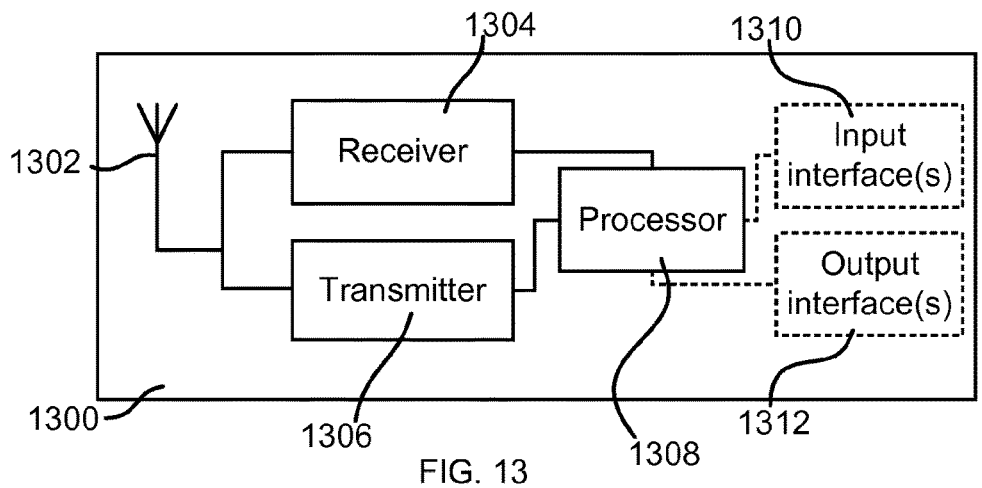
FIG. 13 is a block diagram schematically illustrating a wireless device according to an embodiment.

FIG. 13 is a block diagram schematically illustrating a wireless device 1300 according to an embodiment. The wireless device 1300 comprises an antenna arrangement 1302, a receiver 1304 connected to the antenna arrangement 1302, a transmitter 1306 connected to the antenna arrangement 1302, a processing element 1308 which may comprise one or more circuits, one or more input interfaces 1310 and one or more output interfaces 1312. The interfaces 1310, 1312 can be user interfaces and/or signal interfaces, e.g. electrical or optical. The wireless device 1300 is arranged to operate in a cellular communication network. In particular, by the processing element 1308 being arranged to perform the embodiments demonstrated with reference to FIGS. 1 to 8 and 10, the wireless device 1300 is capable of performing improved reception of control information as disclosed herein. The processing element 1308 can also fulfill a multitude of tasks, ranging from signal processing to enable reception and transmission since it is connected to the receiver 1304 and transmitter 1306, executing applications, controlling the interfaces 1310, 1312, etc.

FIG. 13 may also be seen as a block diagram schematically illustrating a network node 1300 according to an embodiment. For the sake of brevity, FIG. 13 is thus recycled for the schematic illustration of elements of the network node 1300 demonstrated above with reference to FIG. 11. The network node comprises an antenna arrangement 1302, a receiver 1304 connected to the antenna arrangement 1302, a transmitter 1306 connected to the antenna arrangement 1302, a processing element 1308 which may comprise one or more circuits, one or more input interfaces 1310 and one or more output interfaces 1312. The interfaces 1310, 1312 can be operator interfaces and/or signal interfaces, e.g. electrical or optical. The network node 1300 is arranged to operate in a cellular communication network. In particular, by the processing element 1308 being arranged to perform the embodiments demonstrated with reference to FIGS. 1 to 9, the network node 1300 is capable of performing improved conveying of control information as disclosed herein. The processing element 1308 can also fulfill a multitude of tasks, ranging from signal processing to enable reception and transmission since it is connected to the receiver 1304 and transmitter 1306, executing applications, controlling the interfaces 1310, 1312, etc.

Figure 14:
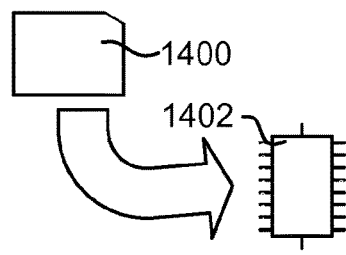
FIG. 14 schematically illustrates a computer-readable medium and a processing device.

The methods according to the present disclosure are suitable for implementation with aid of processing means, such as computers and/or processors, especially for the case where the processing elements 1208, 1258, 1308 demonstrated above comprise a processor handling packing/unpacking of control information as demonstrated above. Therefore, there is provided computer programs, comprising instructions arranged to cause the processing means, processor, or computer to perform the steps of any of the methods according to any of the embodiments described with reference to FIG. 1 to 10. The computer programs preferably comprise program code which is stored on a computer readable medium 1400, as illustrated in FIG. 14, which can be loaded and executed by a processing means, processor, or computer 1402 to cause it to perform the methods, respectively, according to embodiments of the present disclosure, preferably as any of the embodiments described with reference to FIGS. 1 to 10. The computer 1402 and computer program product 1400 can be arranged to execute the program code sequentially where actions of the any of the methods are performed stepwise, but may as well be performed on a real-time basis. The processing means, processor, or computer 1402 is preferably what normally is referred to as an embedded system. Thus, the depicted computer readable medium 1400 and computer 1402 in FIG. 14 should be construed to be for illustrative purposes only to provide understanding of the principle, and not to be construed as any direct illustration of the elements.

The invention claimed is:

1. A method arranged to be performed by a network node of a cellular communication system when operating according to a scheme where system information for enabling a wireless device to access a cell operated by the network node is broadcasted on an anchor channel, the method comprising:
   acquiring a first set of control information and a second set of control information to be provided to the wireless device;
   encoding the first set of control information to an information block;
   adapting the information block based on the second set of control information by selecting at least one of a plurality of partitions of the information block, the selection providing information about the second set of control information; and
   broadcasting the adapted information block on the anchor channel.

2. The method of claim 1, wherein the scheme includes a frequency hopping scheme where information enabling a wireless device to access a cell operated by the network node is periodically transmitted on the anchor channel on a dedicated frequency among the frequencies of the frequency hopping scheme.

3. The method of claim 1, wherein:
   the first set of control information comprises at least one of:
     system bandwidth;
     information about control channels; and
     system frame number; and
   the second set of control information comprises at least one of:

information about the frequency hopping scheme;
periodicity of the periodically transmitted control information on the dedicated frequency;
operating mode of the network node;
applied channel access adaptivity; and
system bandwidth.

4. The method of claim 1, wherein the encoding of the first set of control information comprises:
encoding the control information;
repeating the encoded control information to form an encoded and rate matched sequence; and
scrambling the encoded and rate matched sequence with a scrambling sequence, wherein
the partitions of the information block comprise parts of the information block corresponding to different phases of the scrambling sequence.

5. The method of claim 4, wherein each partition of the information block forms a redundancy version of the information block, wherein the redundancy version provides the information about the second set of control information.

6. The method claim 4, wherein encoding of the first set of information and adapting the information block includes scrambling with a set of a plurality of scrambling phases to form a set of redundancy version of the information block, respectively, wherein the set of redundancy versions provides information about the second set of control information.

7. The method of claim 1, wherein the first set of control information corresponds to at least a subset of information of a master information block of a legacy Long Term Evolution (LTE) system, and the second set of control information corresponds to at least a subset of information enabling the wireless device to receive one of a physical downlink shared channel and a physical downlink control channel.

8. A method arranged to be performed by a wireless device of a cellular communication system when operating according to a scheme where system information enabling wireless devices to access a cell operated by the network node is broadcasted on an anchor channel, the method comprising:
receiving a transmission on the anchor channel; and
decoding the transmission to derive:
an information block comprising a first set of control information; and
a version of the information block among a plurality of versions of the information block indicating a second set of control information by which of the versions that is received.

9. The method of claim 8, wherein the scheme includes a frequency hopping scheme where information, enabling the wireless device to access the cell operated by the network node of the cellular communication system, is periodically transmitted on the anchor channel on a dedicated frequency among the frequencies of the frequency hopping scheme.

10. The method of claim 8, wherein:
the first set of control information comprises at least one of:
system bandwidth;
information about control channels; and
system frame number; and
the second set of control information comprises at least one of:
information about the frequency hopping scheme;
periodicity of the periodically transmitted control information on the dedicated frequency;
operating mode of the network node;
applied channel access adaptivity; and
system bandwidth.

11. The method of claim 8, wherein the decoding of the transmission comprises:
deriving the version of the information block by hypothesizing and evaluating hypotheses, wherein information associated with second set of control information is acquired; and
decoding the information block to acquire the information associated with the first set of control information.

12. The method of claim 8, wherein the deriving of the version of the information block comprises deriving a scrambling phase among a plurality of scrambling phases on which the version of the information block was formed.

13. The method of claim 8, wherein the deriving of the version of a set of information blocks comprises deriving a set of scrambling phases, respectively, among a set of a plurality of scrambling phases on which the versions were formed.

14. The method of claim 8, wherein the first set of control information corresponds to at least a subset of information of a master information block of a legacy Long Term Evolution (LTE) system, and the second set of control information corresponds to at least a subset of information enabling the wireless device to receive a physical downlink shared channel.

15. A network node of a cellular communication system arranged to operate according to a scheme where information enabling a wireless device to access a cell operated by the network node is broadcasted on an anchor channel, the network node being configured to broadcast information on the dedicated frequency by:
acquiring a first set of control information and a second set of control information to be provided to the wireless device;
encoding the first set of control information to an information block;
adapting the information block based on the second set of control information by selecting at least one of a plurality of partitions of the information block, the selection providing information about the second set of control information; and
broadcasting the adapted information block on the anchor channel.

16. A wireless device of a cellular communication system arranged to operate according to a scheme where system information, enabling the wireless device to access a cell operated by a network node of the cellular communication system, is periodically broadcasted on an anchor channel, the wireless device being configured to receive and decode control information by:
receiving a transmission on the anchor channel; and
decoding the transmission to derive:
an information block comprising a first set of control information; and
a version of the information block among a plurality of versions of the information block indicating a second set of control information by which of the versions that is received.

17. The network node of claim 15, wherein the scheme includes a frequency hopping scheme where information enabling a wireless device to access a cell operated by the network node is periodically transmitted on the anchor channel on a dedicated frequency among the frequencies of the frequency hopping scheme.

18. The network node of claim 15, wherein:
the first set of control information comprises at least one of:
- system bandwidth;
- information about control channels; and
- system frame number; and the second set of control information comprises at least one of:
- information about the frequency hopping scheme;
- periodicity of the periodically transmitted control information on the dedicated frequency;
- operating mode of the network node;
- applied channel access adaptivity; and
- system bandwidth.

19. The wireless device of claim 16, wherein the scheme includes a frequency hopping scheme where information, enabling the wireless device to access the cell operated by the network node of the cellular communication system, is periodically transmitted on the anchor channel on a dedicated frequency among the frequencies of the frequency hopping scheme.

20. The wireless device of claim 16, wherein:
the first set of control information comprises at least one of:
- system bandwidth;
- information about control channels; and
- system frame number; and the second set of control information comprises at least one of:
- information about the frequency hopping scheme;
- periodicity of the periodically transmitted control information on the dedicated frequency;
- operating mode of the network node;
- applied channel access adaptivity; and
- system bandwidth.

\* \* \* \* \*